Sept. 5, 1944.   H. C. FRENCH ET AL   2,357,511
ROAD MACHINE TRACK FRAME MOUNTING
Filed Jan. 3, 1944   3 Sheets-Sheet 1
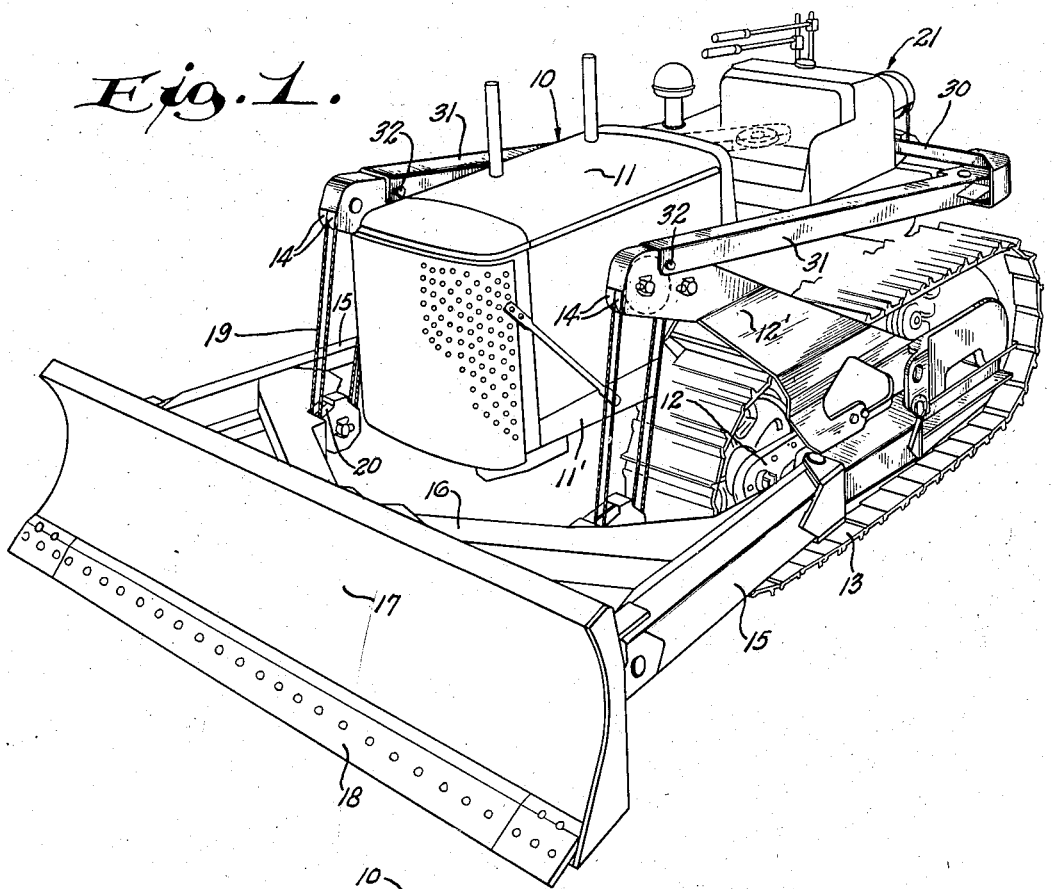
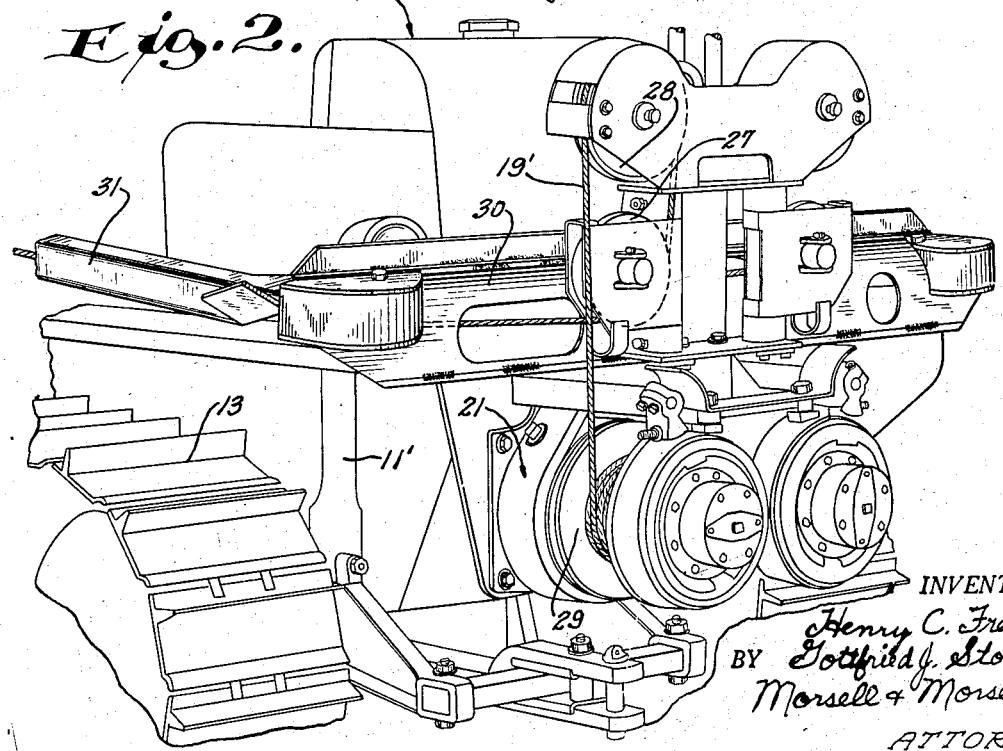
INVENTORS
Henry C. French &
BY Gottfried J. Storatz,
Morsell & Morsell
ATTORNEYS.

Sept. 5, 1944.  H. C. FRENCH ET AL  2,357,511
ROAD MACHINE TRACK FRAME MOUNTING
Filed Jan. 3, 1944   3 Sheets-Sheet 2
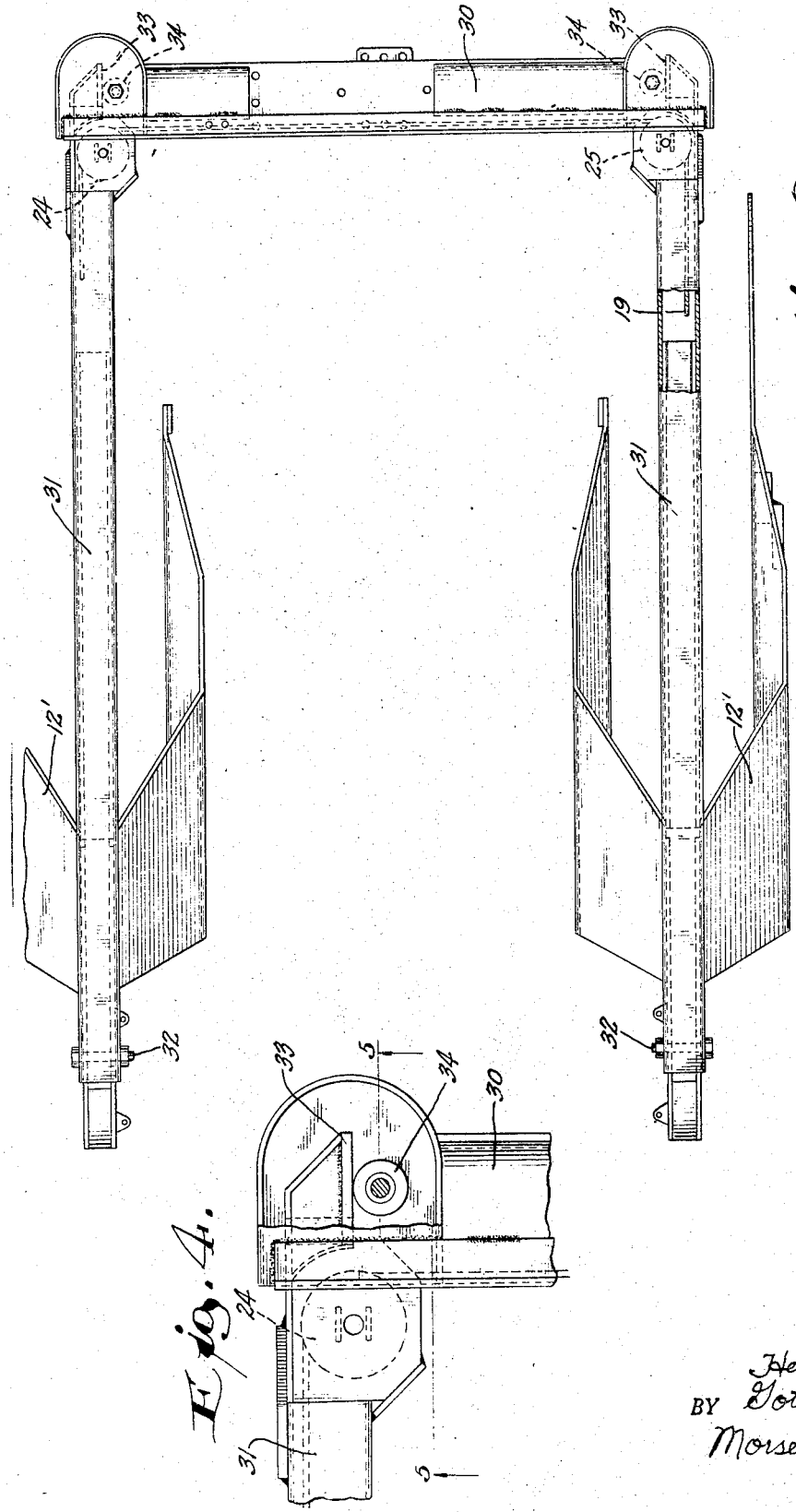
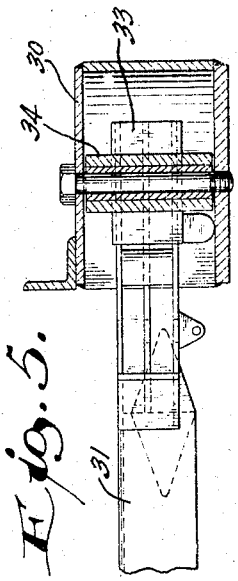
INVENTORS
Henry C. French &
BY Gottfried J. Storatz,
Morsell & Morsell
ATTORNEYS Sept. 5, 1944.   H. C. FRENCH ET AL   2,357,511
ROAD MACHINE TRACK FRAME MOUNTING
Filed Jan. 3, 1944    3 Sheets-Sheet 3

INVENTORS
Henry C. French &
BY Gottfried J. Storatz,
Morsell & Morsell
ATTORNEYS.

Patented Sept. 5, 1944

2,357,511

UNITED STATES PATENT OFFICE 2,357,511

ROAD MACHINE TRACK FRAME MOUNTING

Henry C. French, Elm Grove, and Gottfried J. Storatz, Wauwatosa, Wis., assignors to The Heil Co., Milwaukee, Wis., a corporation of Wisconsin Application January 3, 1944, Serial No. 516,808

8 Claims. (Cl. 37—144)

This invention relates to improvements in road machine track frame mountings.

A road machine such as a trailbuilder or a bulldozer has a forward blade-carrying mold board mounted on arms which are pivotally carried by portions of a track frame. A winch or power control unit rigidly mounted on the rear of the machine tractor frame or chassis winds and unwinds cables extended to the mold board-carrying arms for the purpose of raising and lowering the mold board and blade relative to the ground being worked. As the tractor chassis is pivotal relative to the track frame it has been found that when a pull is exerted on the cable to lift the mold board-carrying arms, if special provision is not made to prevent it, the pull imposed by the cables on the rear of the tractor chassis will cause the front end of the tractor chassis to jack-knife toward the ground and relative to the track frame. Attempts have been made to overcome this objectionable contingency and it has been proposed heretofore to movably mount a rear transverse cable housing on the tractor and to extend between its ends and the mounting brackets of the machine track frame rigid cable housing connecting members. This arrangement serves to prevent jack-knifing of the tractor chassis when the cables exert a pull but requires a complicated, unsatisfactory mounting for said rear transverse cable housing.

With the above in mind it is, therefore, a primary object of the present invention to overcome the objections and difficulties mentioned by the provision, in a cable operated road machine, of simple and effective means for mounting certain portions of the operating cables and sheaves including a tractor carried immovable rigid rear transverse housing having slidably associated therewith sheave and cable carrying side housing and connecting members which also engage the mounting brackets of the machine track frame, said arrangement serving to prevent jack-knifing of the tractor chassis when the cables are operated.

A further object of the invention is to provide in a road machine track frame mounting, a chassis anchored, transverse housing member engaged by relatively slidable cable side housing members which transmit longitudinal cable tension to the mounting brackets alone.

A further object of the invention is to provide in a road machine track frame mounting a relationship of elements which eliminates the imposition of forwardly directed stresses on the ends of a chassis mounted rear transverse member.

A further object of the invention is to provide a road machine track frame mounting which is readily installed on a road machine, which is relatively simple and inexpensive, which is strong and durable and effective in the performance of its duty, and which is well adapted for the purposes described.

With the above and other objects in view the invention consists of the improved road machine track frame mounting, and its parts and combinations as set forth in the claims, and all equivalents thereof.

In the accompanying drawings in which the same reference characters indicate the same parts in all of the views:

Fig. 1 is a front and side perspective view of a cable operated trailbuilder equipped with the improved track frame mounting;

Fig. 2 is a rear perspective view of a trailbuilder including a power control unit and associated portions of the track frame mounting, said view being on a slightly enlarged scale;

Fig. 3 is a plan view of the rear transverse cable housing member, and the associated cable housing connecting side members, and the machine track frame mounting brackets, forming the essential elements of the improved mounting;

Fig. 4 is an enlarged, fragmentary detail view, with portions broken away, of the slidably associated end portions of the rear transverse cable housing member and a side member;

Fig. 5 is a detail sectional view taken on line 5—5 of Fig. 4; and

Figure 6:
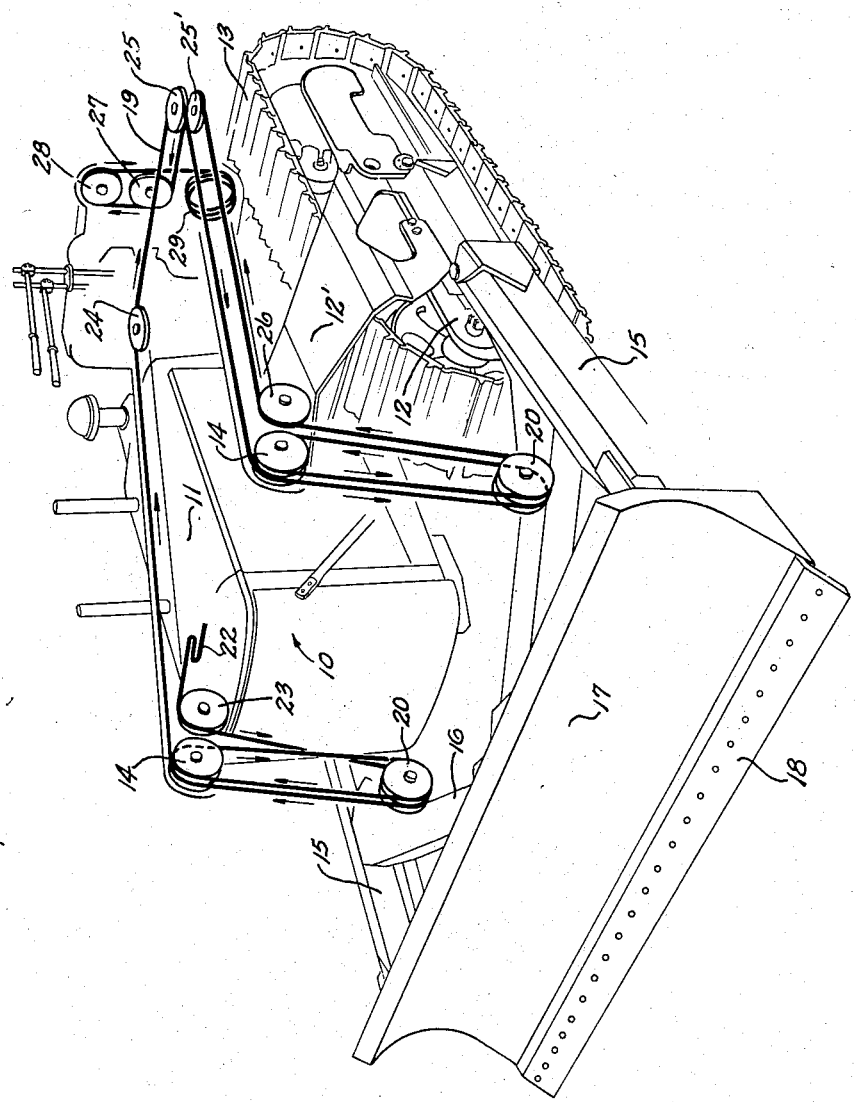
Fig. 6 is a skeleton perspective view of a trailbuilder showing schematically the arrangement of the sheaves and operating cables therefor.

Referring now more particularly to the drawings it will appear that a road machine in the form of a trailbuilder is indicated generally by the numeral 10. As is conventional the trailbuilder includes a tractor 11 having a chassis portion 11' pivotally mounted relative to a track frame 12 about which a traction device 13 operates. On opposite sides of the tractor, integral with the track frame 12, are upwardly projecting massive track frame mounting brackets 12' in the ends of which sheaves 14 are journalled. The ends of the arms 15 of a mold board frame 16 are pivotally mounted on the track frame. Said mold board frame projects forwardly of the tractor and adjustably carries a transverse mold board 17 whose lower edge is formed as or carries a blade 18. It is, of course, necessary that the mold board frame be pivotally mounted so that its forward end which carries the mold board and blade may be raised and lowered relative to the ground being worked. An elongated laced cable 19 extends to and engages sheaves 20 on the mold board frame and upon winding and unwinding of the cable by a winch or power control unit 21, the desired raising and lowering movement of the mold board frame is effected. The power control unit 21 is anchored relative to the rear of the tractor chassis.

The cable lacing arrangement in its relationship to the actuatable elements of the trailbuilder 10 and the various sheaves is illustrated schematically in Fig. 6. One end of the elongated cable 19, which is anchored on a portion of the machine, is indicated at 22, and forwardly thereof said cable extends over a guide sheave 23 and from thence downwardly about one of the sheaves 20 on the mold board frame. From the sheave 20 the cable is extended upwardly to engage one of the bracket-carried sheaves 14 on one side of the machine and is then engaged with the companion sheave 20 and is extended back to and about a companion sheave 14. The cable 19 then extends rearwardly longitudinally along one side of the tractor and is engaged at the rear of the machine with a guide sheave 24, from whence the cable extends transversely across the rear of the tractor to another rear guide sheave 25 and then forwardly longitudinally along the other side of the machine and over a bracket-carried sheave 14 to a mold board-carried sheave. After being extended so as to engage a companion sheave 14 and another mold board-carried sheave 20, the cable passes upwardly to a guide sheave 26 and then rearwardly longitudinally along the side of the machine to a sheave 25' which is companion to the rear sheave 25. From thence the cable engages a winch-carried guide sheave 27 and passes upwardly and about a fairlead sheave 28. From the fairlead sheave the downwardly directed extent of the cable is guidingly wound on the drum 29 of the power control unit or winch 21. Normally the rear guide sheaves 25 and 25' are anchored with respect to the power control unit or rear chassis or frame portion of the tractor. As a result, when the cable is wound on the winch drum 29, the pulling strains are taken directly by the rear of the tractor chassis and this would cause a foreshortening tendency in respect to the longitudinal extents of cable between the upper ends of the bracket 12' and the rear sheaves 25 and 25'. As the tractor chassis is pivotal with respect to the track frame 12, which carries the bracket 12', such pulling strains, without the interposition of a rigid element between the brackets 12' and the rear end of the tractor chassis, would cause a jack-knifing of the front end of the tractor relative to the track frame. The present invention has as its main object the elimination of the difficulty mentioned and is accomplished through the mechanisms and structural elements hereinafter to be described.

The numeral 30 indicates a rear transverse cable housing which in the present invention is immovably anchored to the tractor chassis and power control unit frame. The housing 30 has a hollow interior to accommodate extension of the cable and has its end portions formed with forward openings. On each side of the tractor are rigid cable housing connecting members 31, of hollow formation, with each being extended between the upper end of a mounting bracket 12' and an adjacent end of the rear transverse housing member 30. The forward ends of the side connecting members 31 are pivotally connected to the upper ends of the brackets 12' by pivot bolts 32. The rear ends of the side housing members 31 extend slidably into the open ends of the rear transverse connecting member 30, being provided with skid-like extensions 33 which have sliding or rolling contact with rollers 34 mounted on vertical axes within the end portions of the rear transverse connecting member 30.

As opposed to conventional practices, therefore, the side housing connecting members 31 are slidably associated with the ends of the rear transverse housing member 30. As further opposed to standard practice, the rear guide sheaves 24, 25 and 25' are not carried by an element anchored to the rear of the tractor frame or power control unit but are, on the contrary, journalled within the rear end portions of the side cable housing connecting members 31 with the result that the pivotal connections 32 and sheaves 24 or 25 are carried by the same rigid element, preventing any foreshortening tendency of the longitudinal extents of cable.

It will, therefore, be evident that in the operation of the road machine, when the winch is functioning to wind the cable on the drum 29, there will be relative downward movement of the upper ends of the mounting brackets 12' and an elevation of the mold board-carrying frame 16. The side cable housing connecting members 31. being pivotally connected to the brackets 21 will move forwardly and the rear ends of the members 31 slide forwardly on the rollers 34 in the rear transverse housing member 30. The result is that the effective lengths of the cable portions between the sheaves 14 and 24 and 14 and 25 remain constant. As the sheaves 24 and 25 are independent of the rear transverse housing 30 and the tractor chassis, no pull is imposed on the rear of the tractor chassis and any jackknifing tendency as between the tractor chassis and the track frame is positively prevented. Longitudinal cable tension is carried only by the track frame brackets 12'. Strains or pulls on the ends of the anchored rear transverse housing 30 are entirely eliminated. The rear transverse housing 30 does, however, serve to take any rear cross cable loads and keeps the rear sheaves 24 and 25 properly spaced.

From the foregoing description it will be evident that the improved track frame mounting is incorporated in a cable operated road machine in a simple, inexpensive and effective manner. The mounting arrangement is, furthermore, novel and well adapted for the purposes described.

What is claimed as the invention is:

1. In a road machine including a tractor having a track frame and a chassis, the track frame and chassis being pivotal relative to each other, an implement pivotally mounted relative to the track frame, a power control unit anchored on said chassis, cable means extended to and actuated by the power control unit and connected with the implement for moving the same, a transverse cable housing member immovably mounted relative to the power control unit, and a side cable housing member interposed between portions of the track frame and the transverse cable housing member and slidably associated with the latter, the cable being guidingly associated with portions of the track frame, side cable housing member, and transverse cable housing member.

2. In a road machine including a tractor having a track frame and a chassis, the track frame and chassis being pivotal relative to each other, an implement pivotally mounted relative to the track frame, a power control unit anchored on said chassis, cable means extended to and actuated by the power control unit and connected with the implement for moving the same, a transverse cable housing member immovably mounted relative to the power control unit, and a side cable housing member pivotally connected at one end with a portion of the track frame and slidably associated at its other end with a portion of the transverse cable housing member, the cable being guidingly associated with portions of the track frame, side cable housing member, and transverse cable housing member.

3. In a road machine including a tractor having a track frame and a chassis, the track frame and chassis being pivotal relative to each other, an implement pivotally mounted relative to the track frame, a power control unit anchored on said chassis, a transverse cable housing member immovably mounted relative to the power control unit, a side cable housing member pivotally connected at one end with a portion of the track frame and slidably associated at its other end with a portion of the transverse cable housing member, cable means extended between the power control unit and the implement for moving the latter, portions of the cable being housed within said transverse and side cable housing members, and a guide sheave engaged by the cable mounted within said slidable end portion of the side cable housing member.

4. In combination with a road machine having a track frame with an integral mounting bracket, a power control unit, a pivotally mounted mold board frame and a cable operatively extended between the power control unit and the mold board frame, a transverse cable housing member rigidly associated with the power control unit and a side cable housing member pivotally associated at one end with said bracket and slidingly associated at its other end with said transverse cable housing member, portions of the cable being guidingly extended through said transverse cable housing member and the side cable housing member.

5. In a road machine provided with a track frame having a pair of opposite integral mounting brackets, a power control unit, a pivotally mounted mold board frame, and a cable operatively extended between the power control unit and the mold board frame, the combination of a transverse cable housing member rigidly associated with the power control unit, and a pair of side cable housing members pivotally associated at one pair of ends with said mounting brackets and slidably associated at their other pair of ends with the opposite ends of the transverse cable housing member, portions of the cable being guidingly extended through said transverse cable housing member and said side cable housing members and engaged with said brackets.

6. In a road machine including a tractor having a track frame and a chassis, the track frame and chassis being pivotal relative to each other, a front implement pivotally mounted relative to the track frame, a power control unit anchored on a rear portion of said chassis, cable means extended to and actuated by the power control unit and connected with the implement for moving the same, a transverse cable housing member immovably mounted relative to the rear of the tractor chassis, and a side cable housing member interposed between portions of the track frame and the transverse cable housing member and slidably associated with the latter, the cable being guidingly associated with portions of the track frame, side cable housing member, and transverse cable housing member.

7. In a road machine including a tractor having a track frame and a chassis, the track frame and chassis being pivotal relative to each other, a front implement having a frame portion pivotally mounted relative to the track frame, a power control unit anchored on the rear of said chassis, cable means extended to and actuated by the power control unit and connected with the implement frame for moving the same, a transverse cable housing member immovably mounted relative to the power control unit, a side cable housing member pivotally connected at one end with a portion of the track frame and slidably associated at its other end with a portion of the transverse cable housing member, a sheave mounted on a portion of the implement frame, and a sheave carried by the slidable end of the side cable housing member, the cable being movably engaged by said sheaves and being guided through portions of said side cable housing member and transverse cable housing member.

8. In a road machine provided with a track frame having a pair of opposite integral mounting brackets, a chassis-mounted, rear power control unit, a pivotally mounted, forwardly extending mold board frame, and a cable operatively extended between the power control unit and the mold board frame, the combination of a transverse cable housing member rigidly associated with the power control unit, a pair of side cable housing members pivotally associated at one pair of ends with said mounting brackets and slidably associated at their other pair of ends with the opposite ends of the transverse cable housing member, and sheaves within the slidable ends of the side cable housing members, portions of the cable being guidingly extended through said transverse cable housing member, over said sheaves and through said side cable housing members and engaged with said brackets.

HENRY C. FRENCH.
GOTTFRIED J. STORATZ.